United States Patent [19]

Manabe

[11] Patent Number: 5,784,657
[45] Date of Patent: Jul. 21, 1998

[54] CAMERA HAVING A DISPLAY PANEL

[75] Inventor: Mitsuo Manabe, Saitama, Japan

[73] Assignee: Fuji Photo Optical Co., Ltd., Saitama, Japan

[21] Appl. No.: 786,304

[22] Filed: Jan. 22, 1997

[30] Foreign Application Priority Data

Jan. 30, 1996 [JP] Japan ................... 8-014637

[51] Int. Cl.$^6$ .................................................. G03B 17/02
[52] U.S. Cl. ................................. 396/299; 396/297
[58] Field of Search ............................ 396/281, 297, 396/299

[56] References Cited

U.S. PATENT DOCUMENTS

| | | | |
|---|---|---|---|
| 4,483,601 | 11/1984 | Sekida et al. | 396/299 |
| 4,699,486 | 10/1987 | Konno et al. | 396/299 |
| 4,699,492 | 10/1987 | Iwashita et al. | 396/299 |
| 4,742,369 | 5/1988 | Ishii et al. | 396/281 |
| 4,751,538 | 6/1988 | Konno | 396/281 |
| 5,081,482 | 1/1992 | Miki et al. | 396/299 |

*Primary Examiner*—Eddie C. Lee
*Assistant Examiner*—Nicholas J. Tuccillo
*Attorney, Agent, or Firm*—Young & Thompson

[57] ABSTRACT

A display panel is incorporated on the back of a camera body and a cover plate is pivotally attached to the side of the camera body. Operating buttons are provided on the inside of the cover plate. When the cover plate is closed, the operating buttons are contained in the camera body and covered with the cover plate. When the cover plate is opened, the inside of the cover plate faces substantially parallel to an indicating surface of the display panel. At this time, the operating buttons and the display panel are visible from a common vantage point.

11 Claims, 4 Drawing Sheets

CAMERA HAVING A DISPLAY PANEL

BACKGROUND OF THE INVENTION

1. Field of the Invention

The present invention relates to a camera having a display panel which indicates photographic information.

2. Description of the Related Art

In recent cameras equipped with a date photographing function, a self timer function and so on, cameras incorporating a liquid crystal display panel are known. The display panel is provided on a rear surface of a camera body and indicates photographic information. The camera body is provided with operating buttons for setting the date photographing function and the self timer function. As operations of the buttons are displayed by the display panel, it is possible to confirm that the operation is certainly carried out or not.

In above-described cameras, some of them employ a cover. The cover is pivotally attached to a camera body and is openable relative to the camera body. When the cover is closed, operating buttons are hidden by the cover. And when the cover is opened, the operating buttons appear. It is supposed that the buttons may be prevented from being operated by accident, as the buttons are hidden by the cover when the buttons are not used. Further, it is supposed that the camera body may be thinned by providing the cover and the operating buttons on the side of the camera body.

However, in such a camera, the operating buttons are provided in a manner that the buttons face in a different direction with an indicating surface of the display panel. Therefore, an operator can not operate the buttons, watching the display panel. Further, as the operation of the buttons and the confirmation of the operation are carried out by shifting the camera, there arises a problem in that the operator can not look through a finder at an object immediately after operating the button.

SUMMARY OF THE INVENTION

In view of the forgoing, a primary object of the present invention is to provide a camera in which a display panel and an operating button are visible from a common vantage point.

Another object of the present invention is to provide a camera in which use of a button may be carried out easily.

A further object of the present invention is to provide a camera in which a photographer can look through a view finder at an object immediately after operating a button.

To achieve the above and other objects, according to the present invention, a camera having a display panel is provided with a cover plate which is pivotally attached to a side of a camera body of the camera. The display panel is incorporated on the back of the camera body. A plurality of operating buttons are attached to the cover plate. The operating buttons are used for setting photographic modes which are indicated by the display panel.

In a preferred embodiment, the cover plate is provided with two fitting portions which are arranged respectively at upper and lower portions of the cover plate. A pivot is provided in a containing portion which is located at a side of the camera body. The pivot is fitted into the fitting portions so that the cover plate is pivotally attached to the camera body. The cover plate pivots between a closed position and an opened position.

When the cover plate is closed, the operating buttons are hidden so as to not be touched carelessly. When the cover plate is opened, the operating buttons appear outside of the camera body and substantially in parallel to an indicating surface of the display panel so that the display panel and the operating buttons may be visible from a single vantage point. Accordingly, the buttons are operable while, watching the display panel. Further, operations of the operating buttons and watching of the display panel are carried out in a state that a photographer faces the back of the camera body so that the photographer can look through a view finder at an object immediately after operating the buttons.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S)

Figure 3:
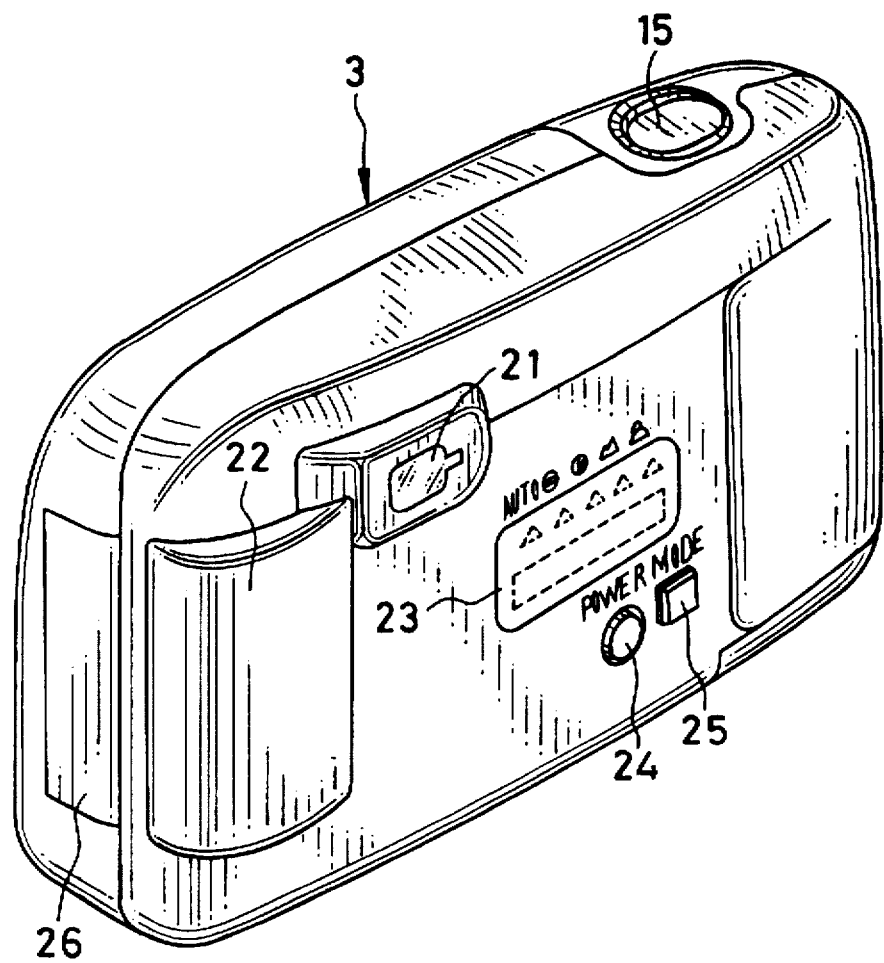
FIG. 3 is a perspective view of the camera according to the present invention.
Figure 4:
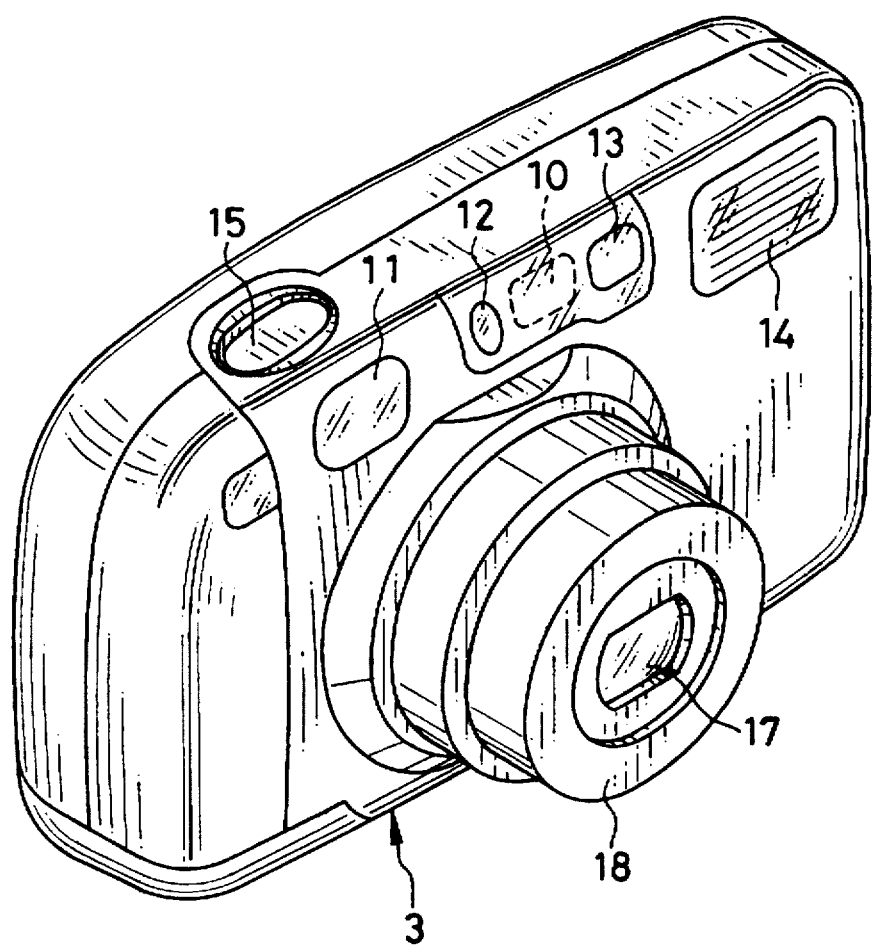
FIG. 4 is a perspective view of the camera according to the present invention.

FIGS. 3 and 4 illustrate perspective views of an external appearance of a camera according to the present invention. As shown in FIG. 4, a view finder window 13, a light emitting window 10 and a light receiving window 11 for auto-focus, photometric window 12 and flash window 14 are provided on a front upper surface of a camera body 3 in which a shutter device and a film advancing device are incorporated. Moreover, a shutter release button 15 is provided on the upper surface of the camera body 3.

A zoom lens barrel 18 is provided on the front central portion of the camera body 3. When a power supply switch 24 is turned on, the zoom lens barrel 18 projects as shown in FIG. 4 from a state that the lens barrel 18 is retracted. The zoom lens barrel 18 contains a taking lens 17 consisting of a zoom lens and focal length is changed at one's discretion by operating a control therefor. When the power supply switch 24 is turned off, the zoom lens barrel 18 is housed in the camera body 3.

As shown in FIG. 3, a eye piece window 21 is provided on the rear upper portion of the camera body 3. A projection 22 is formed on the rear left portion of the camera body 3. The projection 22 contains a battery which is used as a power supply of a film advancing mechanism and so on. A display panel 23, the power supply switch 24 and a photographic mode changing switch 25 are provided on the rear central portion of the camera body 3. A cover plate 26 is provided on one side of the camera body 3 in hinge structure. The cover plate 26 is provided with operating buttons 30a, 30b, 30c, 30d and 30e which are described hereinafter. The cover plate 26 is closed as shown in FIG. 3 when the operating buttons 30a, 30b, 30c, 30d and 30e are not used and a surface of the plate cover 26 constitutes a part of the external appearance of the camera.

A mark "▲" is indicated on upper side of a display of the display panel 23 and at a position of a photographic mode which is chosen so that the selected photographic mode may be confirmed. Moreover, a number of prints, a period of a self timer and so on are indicated on lower side of the display by operating the button 30a, 30b, 30c, 30d and 30e.

Figure 1:
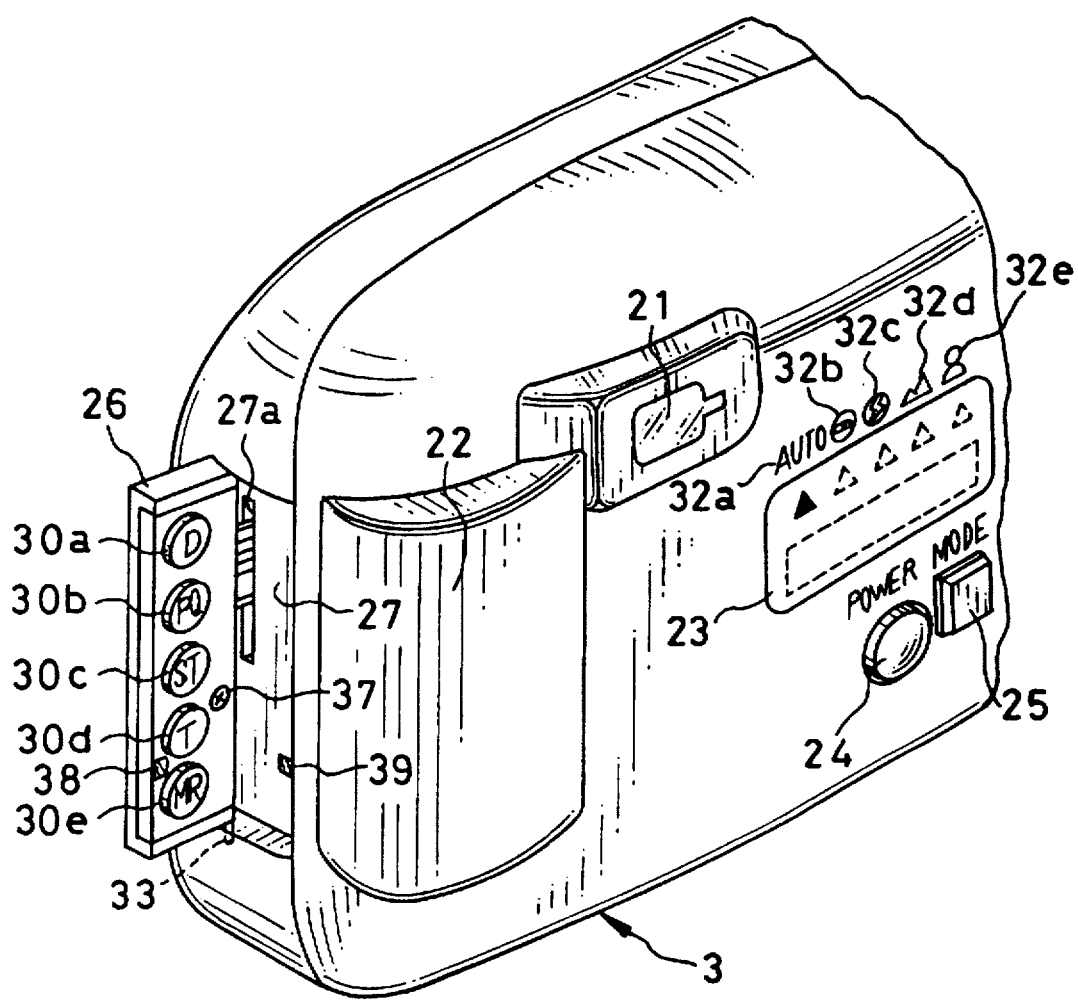
FIG. 1 is a perspective view of an important portion of a camera according to an embodiment of the present invention.
Figure 2:
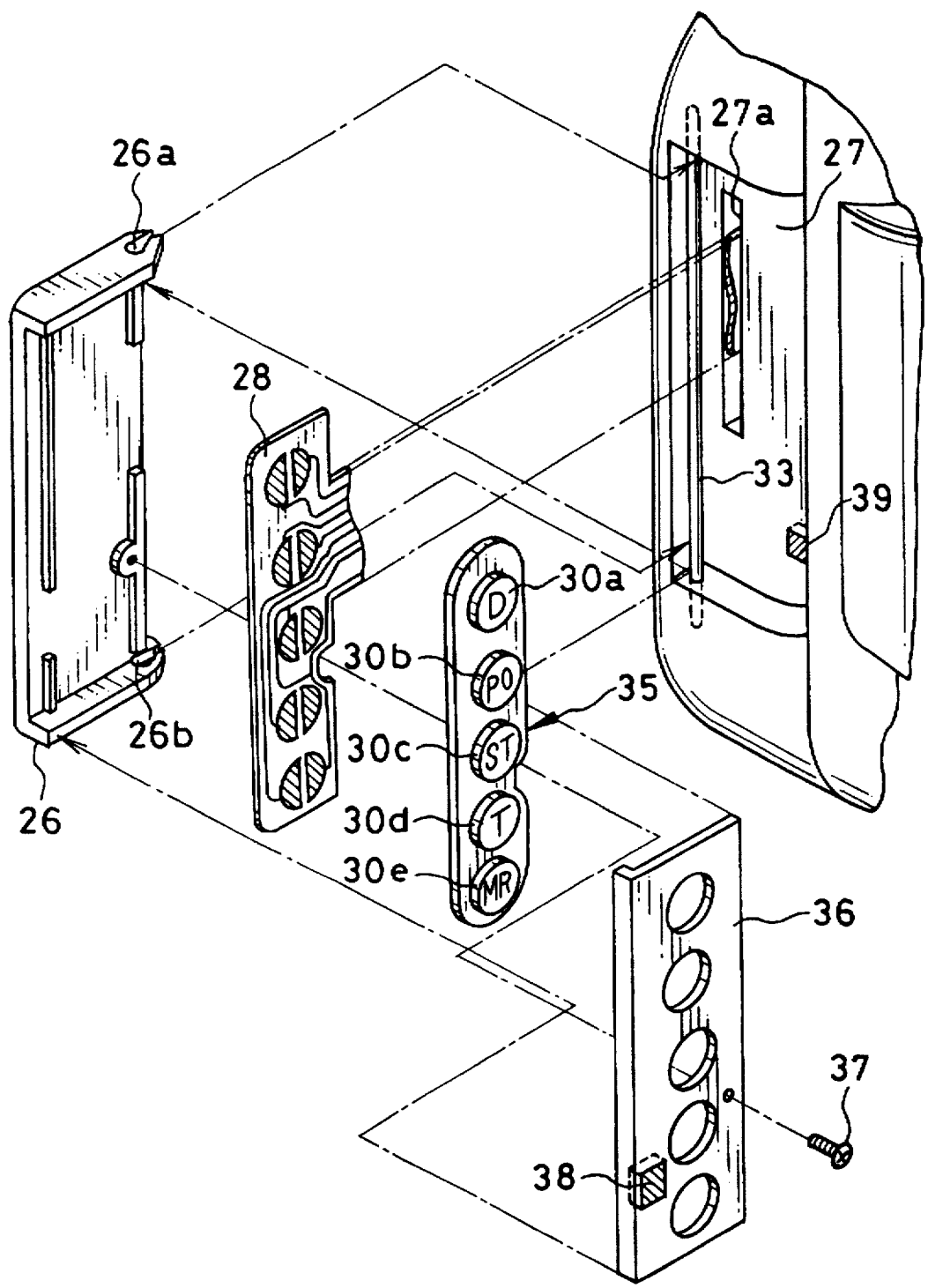
FIG. 2 is an exploded perspective view of an important portion of the camera according to the present invention.

FIG. 2 illustrates the cover plate 26 which is exploded. Fitting portions 26a and 26b are provided at upper and lower portion of the cover plate 26 respectively. A pivot 33 is provided in a containing portion 27 which is located at a side of the camera body 3. The pivot 33 is fitted into the fitting portions 26a and 26b so that the cover plate 26 is pivotally attached to the camera body 3. The cover plate 26 pivots between a closed position in which the operating buttons 30a, 30b, 30c, 30d and 30e are hidden (refer to FIG. 3) and an opened position (refer to FIG. 1).

A flexible circuit board 28 is drawn out from an opening 27a formed in the containing portion 27. The flexible circuit board 28 is provided with switch contacts which are printed at positions corresponding to the operating buttons 30a, to 30e. Each of the contacts is constituted of a pair of electrodes. The operating buttons 30a, to 30e are made of conductive rubber which is well-known and contains carbon. The pair of electrodes of the contact are electrically connected by coming into contact with the operating button tightly. The operating buttons 30a, to 30e are integrally formed as a button unit 35. Alternatively, operating buttons 30a, to 30e may be provided with conductive metals inside thereof respectively. A panel 36 is adapted to be attached to the plate 26 for sandwiching the flexible circuit board 28 and the operating buttons 30a, to 30e between the panel 36 and the plate 26 in a state that the operating button is passed through an opening of the panel 36. The panel 36 is provided with a magnet 38 which is adapted to stick to an iron chip 39 disposed in the containing portion 27 when the cover plate 26 is situated at the closed position.

The flexible circuit board 28 and the button unit 35 are attached to the cover plate 26 and the panel 36 is fixedly secured to the cover plate 26 by a screw 37. The cover plate 26 is locked at the closed position, as the magnet 38 sticks to the iron chip 39. Incidentally, the panel 36 may be provided with an iron chip instead of the magnet 38. In this case, a magnet is disposed in the containing portion 27 instead of the iron chip 39.

As shown in FIG. 1, five photographic modes are respectively represented by marks 32a, 32b, 32c, 32d and 32e which are arranged just above the display panel 23. The marks 32a, 32b, 32c, 32d and 32e denote an auto flash mode, a red-eye phenomenon reducing mode, a compulsion flash mode, a macro mode and a telephotographic mode respectively. The display panel 23 shows the selected photographic mode by indicating the mark "▲" at a position shown by dotted line just under the marks 32a to 32e.

For example, as shown in FIG. 1, when the mark "▲" is indicated under the mark 32a, the auto flash mode is selected. In this case, when the shutter release button is pressed by half stroke, a photometric device disposed at the back of the photometric window 12 carries out photometry and an electronic flash radiates light if brightness of the photographic environment is below a predetermined value.

Referring to other photographic modes, upon setting the red-eye phenomenon reducing mode, a pre-flash is carried out when a shutter is released and a main flash is carried out after a predetermined period passes by from the pre-flash. Upon setting the compulsion flash mode, the electronic flash radiates light for every exposure regardless of brightness of the photographic environment. Upon setting the telephotographic mode, telephotographic zooming is carried out. Further, upon setting the macro mode, macro zooming is carried out. The mark "▲" shifts in laterally direction one by one position with every operating push of the photographic mode changing switch 25 so that the photographic mode may be changed by operating the photographic mode changing switch 25.

The operating buttons 30a, 30b, 30c, 30d and 30e attached to the cover plate 26 are for setting photographed date, for setting a number of prints, for selecting a title, for setting a self timer and for driving a motor to rewind a film respectively. Marks "D", "PQ", "ST", "T" and "MR" are printed on the operating buttons 30a, 30b, 30c, 30d and 30e respectively.

Roles of the operating buttons 30a, to 30e will be described in brief. Upon pressing the operating button 30a, for setting photographed date, the date indicated on the display panel 23 is magnetically recorded as data on a photo film for every one frame when the film is advanced after a photograph is taken. The data is read out by a printer and the printer prints a photograph with the date corresponding to the data.

The operating button 30b is used for setting a number of prints. The number of prints is added every pressing the operating button 30b. The number of prints is magnetically recorded as data in a similar manner to the data of the date when a photograph is taken. The data of the number is read out by the printer when the prints are processed and photographs corresponding to the number are printed.

A plurality of messages, for example "I LOVE YOU", "HAPPY BIRTHDAY", "CONGRATULATIONS" and so force, are set in advance. One of the messages is selected by the operating button 30c and photographed. The messages are indicated by the display panel 23 one by one every pressing the operating button 30c. Upon selecting one of the messages and photographing, data of the message corresponding to the indicated message by the display panel 23 is magnetically recorded on a photo film. The printer reads out the data of the message and prints a photograph with the message.

The operating button 30d is used for setting the self timer. Periods of the self timer, for example 10 seconds and 20 seconds, are indicated by the display panel 23 one by one every pressing the operating button 30d. Upon selecting one of them and pressing the shutter release button 15, the shutter is actuated after the period indicated by the display panel 23 passes. Further, upon pressing the operating button 30e for driving a motor to rewind a film, a spool is rotated in a film winding direction if the film is halfway so that the photo film is rewound in a film cassette. While the film is rewound, an arrow is indicated in the display panel 23. The arrow represents that rewind of the film is carrying out.

A function of the camera stated above will be described below. When the cover plate 26 is closed, the operating buttons 30a, 30b, 30c, 30d and 30e are hidden so as to not be touched carelessly. Further, an external appearance of the camera is improved. The cover plate 26 does not have any projections and is stuck to the camera body 3 by the magnet 38 so that the cover plate 26 is adapted to be not opened carelessly when the camera is carried.

When the cover plate 26 is opened, the operating buttons 30a, 30b, 30c, 30d and 30e appear outside of the camera body 3 and substantially in parallel to an indicating surface of the display panel 23 so that the display panel 23 and the operating buttons 30a, 30b, 30c, 30d and 30e may be visible from a common vantage point. Accordingly, the operating buttons 30a, 30b, 30c, 30d and 30e are operatable, while watching the display panel 23. Further, an operation of the operating buttons and watching of the display panel 23 are carried out in a state that a photographer faces the reverse of the camera body 3 so that the photographer can look through a view finder at an object immediately after operating the buttons. Therefore, handling performance of the camera is improved. Moreover, as the cover plate 26 is attached to the side of the camera body 3, the thickness of the camera body 3 can be reduced in comparison with a camera in which a cover plate is attached to the reverse of a camera body.

In the above-described embodiment, the cover plate 26 is attached to the side of the camera body 3 and the display panel 23 is attached to the reverse of the camera body 3. However, the positions of the cover plate and the display panel are not exclusive. For example, the cover plate 26 may be attached to the top of the camera body 3. Further, the positions of the display panel 23 and the cover plate 26 may be exchanged.

Moreover, in the above-described embodiment, the cover plate is pivotally attached to the side of the camera body. However, the cover plate may be slidably attached to the side of the camera body.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A camera having at least one operating button, a display panel for displaying photographic information set by said operating button and a camera body provided with said display panel at a first surface thereof, said camera comprising:

a plate disposed at a side surface of said camera body which is different from said first surface, said operating button being disposed adjacent to an inside surface of said plate, a flexible circuit board being disposed between the button and the inside surface of the plate, and in contact with the button and the inside surface of the plate when the button is depressed; and supporting means for movably supporting said plate between a first state and a second state, in said first state, said operating button being contained within said camera body and an outer surface of said plate constituting a part of an outer surface of said camera body, and in said second state, said plate projecting out from said camera body and said operating button and said display panel being visible from a common vantage point.

2. A camera according to claim 1, wherein said first surface is a rear surface of said camera body and said side surface is a left side surface of said camera body.

3. A camera according to claim 2, wherein said supporting means support said plate so as to rotate said plate around a line elongated in a vertical direction of said camera body.

4. A camera according to claim 3, wherein said supporting means include a pivot provided in said camera body and a pair of fitting portions provided on said plate, said fitting portions being rotatably fitted to said pivot.

5. A camera according to claim 4, wherein an outer surface of said plate is same with said side surface of said camera body in said first state and said plate stands up relative to said side surface in said second state.

6. A camera according to claim 5, further comprising:

a flexible circuit board drawn out from said camera body;

a pair of switching contacts formed on said flexible circuit board and at a position corresponding to said operating button, said pair of switching contacts being electrically connected when said operating button is pressed; and a panel attached to said plate for sandwiching said flexible circuit board and said operating button between said panel and said plate in a state that said operating button is passed through an opening of said panel.

7. A camera according to claim 6, wherein said operating button is made of conductive rubber.

8. A camera according to claim 6, wherein a magnet is fixed to one of said panel and said camera body and an iron chip is fixed to other of said panel and said camera body in order to keep said plate in said first state by means of magnetic force.

9. A camera comprising:

at least one operating button;

a display panel for displaying photographic information set by the at least one operating button;

a camera body having the display panel disposed upon a first surface thereof; and a solid plate movably attached at a second surface of the camera body, the second surface being different from the first surface, the at least one operating button being disposed adjacent to an interior surface of the plate, a flexible circuit board being disposed between the at least one button and the interior surface of the plate, and in contact with the at least one button and the interior surface of the plate when the at least one button is depressed;

wherein the movable plate is attached to the camera body via supporting means which allow a positional range between a first state, in which the at least one operating button is contained within the camera body and an exterior of the plate conforms essentially with a surrounding portion of the camera body, and a second state, in which the plate extends outward from the camera body, allowing both the at least one button and the display panel to be viewable from a single perspective.

10. A camera according to claim 9, wherein said first surface is a rear surface of said camera body and said second surface is a left side surface of said camera body.

11. A camera comprising:

at least one operating button;

a display panel for displaying photographic information set by the at least one operating button;

a camera body having the display panel disposed upon a rear surface thereof; and a shutter release button disposed on a right side of the camera body; and a plate movably attached at a left side surface of the camera body, the at least one operating button being disposed adjacent to an interior surface of the plate, a flexible circuit board being disposed between the at least one button and the interior surface of the plate, and in contact with the at least one button and the interior surface of the plate when the at least one button is depressed;

wherein the movable plate is attached to the camera body via supporting means which allow a positional range between a first state, in which the at least one operating button is contained within the camera body and an exterior of the plate conforms essentially with a surrounding portion of the camera body, and a second state, in which the plate extends outward from the camera body, allowing both the at least one button and the display panel to be viewable from a single perspective.

* * * * *